Figure 1:
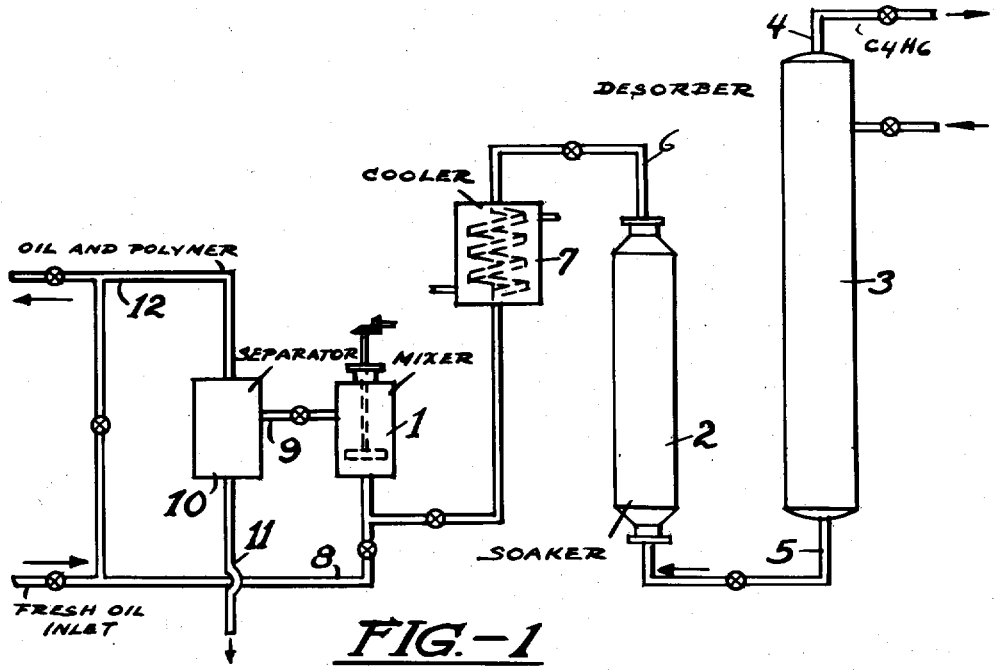

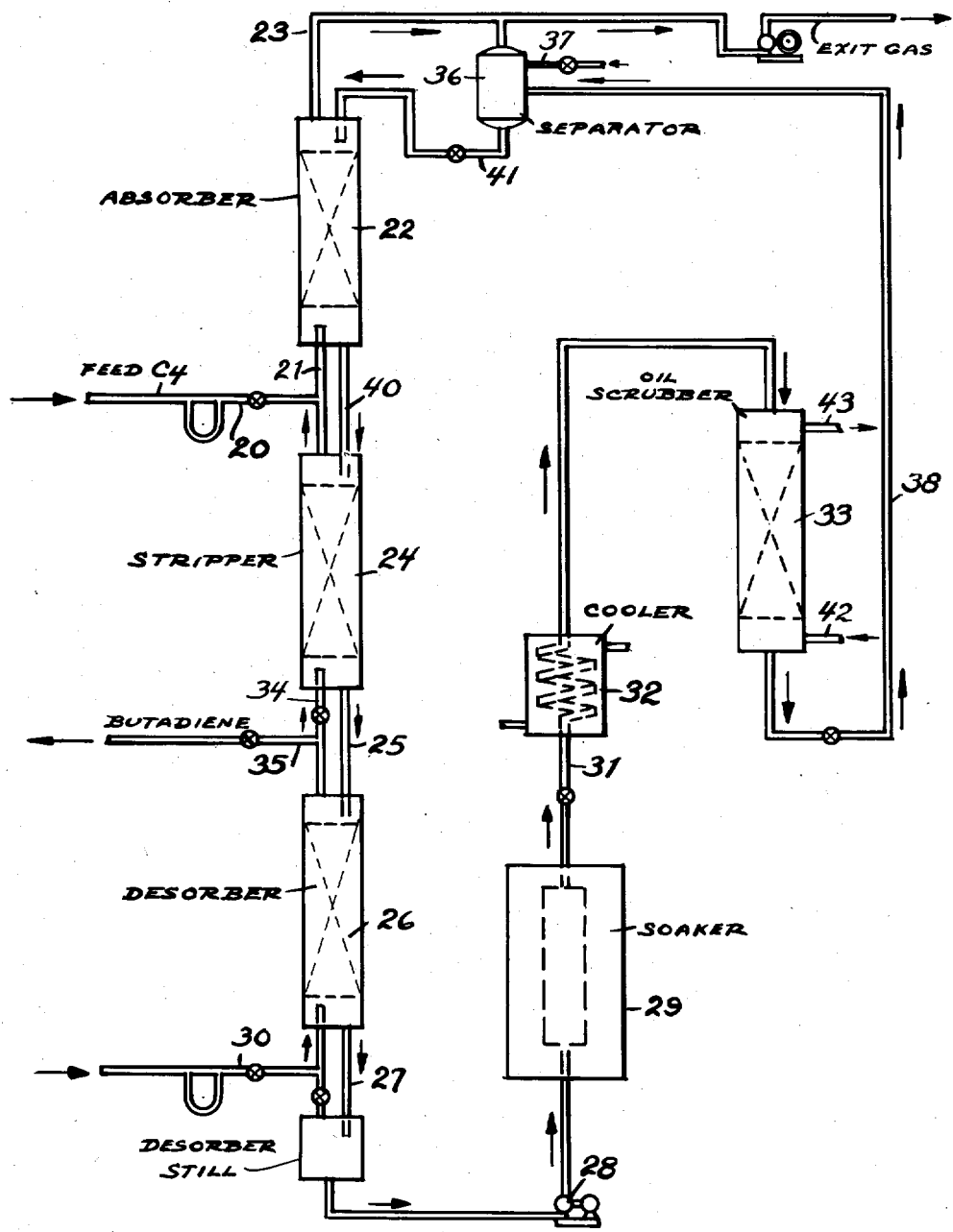

Patented Aug. 28, 1951

2,566,136

UNITED STATES PATENT OFFICE 2,566,136

METHOD OF REMOVING ACETYLENES FROM DIOLEFIN MIXTURES

Charles E. Morrell, Westfield, N. J., assignor to Standard Oil Development Company, a corporation of Delaware Application November 6, 1943, Serial No. 509,168

3 Claims. (Cl. 260—681.5)

This invention relates to improvements in the extraction of diolefins and relates particularly to improvements in the separation of diolefins from mixtures of hydrocarbons containing diolefins and acetylenes by the use of copper salt solutions.

It is known that ammoniacal cuprous acetate solutions of appropriate composition are capable of extracting diolefins for example butadiene, though other diolefins such as isoprene, piperylene and dimethyl butadiene may be similarly extracted from hydrocarbon mixtures such as those obtained by thermal cracking of oil, and by catalytic dehydrogenation of butenes and butanes, yielding as a product butadiene of extremely high purity. It has been found that unsaturated hydrocarbons other than butadiene are also absorbed by the solution when contacted therewith. Among such hydrocarbons are the butenes, the acetylenes and the allenes. The acetylenes of most interest in processes for concentrating butadiene are methyl acetylene, ethyl acetylene and vinyl acetylene. The copper solutions described have quite high dissolving power for the acetylenes. For instance, in the case of a hydrocarbon gas containing 0.1% of any of the acetylenes designated, a copper solution brought to equilibrium therewith at 100° F. contains about 0.19 mol of dissolved acetylenes per liter of solution or about 0.8% by weight. Higher concentrations of acetylenes in the gas phase result in higher concentrations of acetylene dissolved in the solution. It is not feasible or desirable to increase the dissolved acetylenes content of these solutions to too high a level since under such conditions precipitation of solid copper acetylides is encountered. The presence of these solids in an operating system is undesirable since they tend to stop the flow of liquid and since they constitute a hazard due to their tendency to decompose with some violence under proper activation. One means for preventing these difficulties is a regulation of the copper solution composition and, more specifically, the use of ammonia in excess of that required to solubilize the cuprous oxide dissolved in the solution.

Although cuprous acetate solutions of appropriate composition are capable of dissolving appreciable amounts of such acetylenes without precipitating copper acetylides, it is necessary to remove these acetylenes from the solution in any process in which the solution is continually recycled through the butadiene extraction system. Part of these dissolved acetylenes can be removed along with the butadiene product in the step in which the dissolved butadiene is boiled out of the solution. Acetylenes such as vinyl acetylene and ethyl acetylene however are undesirable in the product butadiene and hence only limited amounts can be removed from the solution in this manner. Another method for removing the dissolved acetylenes is to boil them out of the copper solution together with ammonia in a step subsequent to the one in which butadiene is boiled out of the solution. Still another method for effecting acetylenes removal consists of heating the solution for an appropriate period of time at temperatures in the range of 160–200° F. subsequent to the removal of butadiene in the desorption step of a cyclic process. In such a heating step acetylenes such as ethyl acetylene, vinyl acetylene, methyl acetylene (hereafter designated as monomeric acetylenes) are polymerized to higher boiling materials. This is described in our co-pending application, Serial No. 453,544, filed August 4, 1942, of which the present application is a continuation-in-part. It has been found that the initial step in such a polymerization reaction consists of formation of dimers in the case of pure acetylenes and of codimers in the case of mixed acetylenes. If butadiene and allenes are present copolymers of the acetylenes and these hydrocarbons are also formed. Some polymerization of the butadiene and allenes likewise results. These resulting dimeric materials are considerably less soluble in the copper solution than are the monomeric acetylenes from which they are derived. Under prolonged heating conditions, however, the dimers and codimers formed in this manner continue to polymerize giving rise to materials of higher molecular weight which in many instances may be insoluble in all common solvents. The nature of these higher molecular weight polymers depends to a considerable extent upon the following factors:

1. The nature of the monomeric acetylenes from which they are derived.
2. The physical conditions under which the dimers are polymerized.

The most important of these conditions are the temperature and medium in which polymerization occurs. In regard to the latter it has been found that if the dimers are dissolved in a solvent such as a hydrocarbon in which they are miscible and allowed to polymerize in such a medium the nature of the resulting high molecular weight materials is different from the nature of the materials obtained when no added hydrocarbon solvent is present. For instance, if the dimers are dissolved in a highly aromatic fraction such as xylenes or solvent naphtha and the resulting solution heated the resulting materials, even when extremely polymerized, are still soluble in this solvent. If the polymers are not formed in the presence of these solvents, they are completely insoluble in these solvents when once formed.

The object of this invention is to provide a means for continuously separating both acetylenes and other polymers from the absorbent copper solutions in a cyclic process for concentrating butadiene and other olefins. This object is accomplished by removing these polymers from the solution by contacting the latter with a liquid which is not appreciably miscible with the copper solution and which is capable of dissolving considerable amounts of both the acetylene polymers and other polymers from the latter. Such solvents include hydrocarbon fractions of a wide range of boiling points, more specifically, those boiling from the $C_4$ range through the gas oil range. They may consist of paraffins, naphthenes, olefins and aromatics or mixtures of these, although fractions relatively high in olefins and/or aromatics are preferred. For example, the solvent may be composed of butenes. Other solvents which are effective for this purpose are higher alcohols, that is, alcohols containing more than 5 carbon atoms, ketones containing more than 5 or 6 carbon atoms and other oxygenated materials which are of limited solubility in the copper solution and which do not react chemically with the solution. The latter are of limited applicability, however, due to their relatively high cost and for this reason we prefer to use hydrocarbon materials.

The solubility of the polymers in hydrocarbon fractions varies with the nature of the fraction and with the molecular weight of the polymer. Polymers of higher molecular weight are less soluble than those of lower molecular weight. Ethyl acetylene and methyl acetylene by themselves and in mixtures with each other do not exhibit tendencies to form polymers of sufficiently high molecular weight that marked insolubility of the resulting polymers in hydrocarbons of a wide range of compositions and boiling points is manifested. In the case of vinyl acetylene, however, and of mixtures of vinyl acetylenes with other acetylenes, polymers of sufficiently high molecular weights are obtained so that they are not completely soluble even in the case of solvents of high dissolving power such as aromatic fractions. However, even in the case of these polymers which are not completely soluble in hydrocarbons it has been discovered that these polymers are effectively separated from the solution, in which they are in suspension, by washing the solution with a hydrocarbon. While this action undoubtedly is in part one of solution of the polymer there is also involved a wetting of the undissolved polymer by the oil to such a degree that it is preferentially retained by the hydrocarbon rather than by the copper solution. In such cases, it is observed that the portion of the polymers insoluble in the hydrocarbon tends to form a sludge in the hydrocarbons and under conditions of prolonged standing will settle out to form a slurry, in the lower part of the hydrocarbon, of high polymer content.

Figure 2:
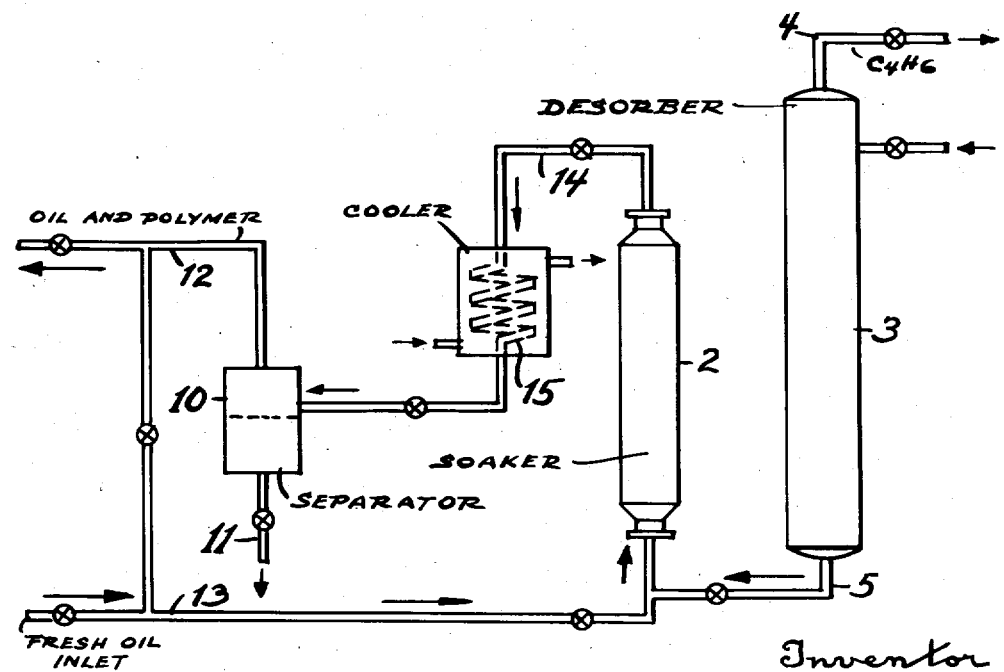

The invention is more clearly illustrated by the following description with reference to the drawings, Fig. 1, Fig. 2 and Fig. 3 showing various diagrammatic flow plans.

In view of the above considerations there are several possible methods of actually carrying out this process in practice. Fig. 1 consists of contacting the solutions in appropriate equipment such as turbo mixer 1, packed tower, or in a mixing centrifugal pump, with the hydrocarbon immediately after the step in which the butadiene-free solution is heated in soaker 2 under conditions appropriate for converting the monomeric acetylenes to polymer. The cuprous salt solution is desorbed of butadiene in desorber 3, the butadiene being removed through pipe 4. The butadiene-free solution passes through pipe 5 to soaker 2 where it is heated to polymerize the acetylenes and passed through pipe 6 and cooler 7 to pipe 8. Oil is passed through pipe 8 and the two, oil and essentially butadiene-free solution, passed to mixer 1. The mixed solution and hydrocarbon are passed through pipe 9 to separator 10 from which the cuprous solution is withdrawn through pipe 11 and oil with polymer in solution through pipe 12. Under these conditions the polymers are largely removed as the dimers and codimers since in actual practice it has been found that the dimers formed in the solution-soaking stage have not had sufficient time at high temperatures to polymerize much beyond the dimer stage. Under such conditions the polymers are largely soluble in hydrocarbon solvent. The scrubbing operation may be conducted at temperatures from atmospheric to 200° F. Preferably, however, the temperatures should be kept as low as possible in order to retard further polymerization of the polymers dissolved in the oil and minimize the amount of sludge polymers obtained in the oil phase.

Referring to Fig. 2, another method for carrying out this process consists of injecting the hydrocarbon through pipe 13 into the butadiene-free solution as it passes through pipe 5 and circulating this oil therefrom through the soaker 2 in which the solution is heated to convert the monomeric acetylenes to polymers. The mixture of oil and polymer is then passed through pipe 14, cooler 15 to separator 10. The oil is then separated under gravity from the copper solution and may be returned to the solution soaking stage 2, with some discard to prevent undue accumulation of polymers in the oil, through pipes 12 and 13 together with some fresh oil.

The resulting solution (and/or suspension) of polymers in the hydrocarbon solvent may be treated in a number of ways after separation from the copper solution. In one method of operation the hydrocarbon containing polymer is simply discarded or burned after the polymers have accumulated in the added hydrocarbon to the extent of 5-50%. In other cases it may be desirable to remove part of the hydrocarbon solvent by distillation overhead from the polymers. This operation may be carried out in the presence of a flux oil of higher boiling point than the original solvent. For instance, in case benzene is used to scrub the solution, the solution of polymers in benzene may be fed to a fractionating column into the bottom of which a heavy oil such as a gas oil is continuously fed. The benzene is taken overhead leaving the polymers in the oil which can subsequently be fed to a burning ground or to a furnace. In certain cases it is desirable to add to the solvent an anti-oxidant inhibitor such as phenols, polyhydric aromatics, aromatic amines and amino phenols. The purpose of these compounds is to retard polymerization to insoluble polymers and to prevent accumulation of peroxides in the polymers as a result of contact with air.

EXAMPLE

In equipment shown in Fig. 3 a 72-hour run was conducted in which a copper solution was contacted with a C4 cut containing 75% butadiene and 2½% acetylenes, these acetylenes being an equimolar mixture of vinyl and ethyl acetylene. The ratio of solution and hydrocarbon feed rates were such that the solution picked up 0.02 mol/liter (1.0 gram/liter) of acetylene per cycle through the system. After boiling off the butadiene in the desorption zone the solution was heated in the soaker for about 40 minutes thereby polymerizing 0.0199 mol of acetylene per liter of solution per pass. The solution leaving the soaker was scrubbed with xylene in a packed tower and the solution continually returned to the absorption system. This operation was continued for 72 hours and the solution tested at various times for its polymer content after leaving the zone in which it was scrubbed with xylene.

The C4 cut was passed through pipe 20 to pipe 21 and absorber 22, the butadiene- and acetylene-free gas being removed from absorber 22 by pipe 23. A cuprous solution introduced into absorber 22 through pipe 41 passed in countercurrent flow to the C4 cut. The cuprous solution containing dissolved butadiene and acetylenes passed from absorber 22 by pipe 40 to stripper 24 where it was heated to 80° F. by heating means not shown. The heated cuprous solution was passed through pipe 25 to desorber 26 where it was heated further to 145° F. The cuprous solution was then passed through pipe 27 by means of pump 28 to soaker 29 maintained at 180° F. Make-up ammonia was added through pipe 30 to desorber 26. The cuprous solution was then passed through pipe 31 and cooler 32 to scrubber 33 where it was scrubbed with xylene. Tower 33 was simply a packed tower filled with xylene introduced through pipe 42 through which the solution flowed. The cuprous solution with some entrained xylene passed through pipe 38 through separator 36 to the top of absorber 22. Separator 36 allowed the xylene to separate from the cuprous solution, the xylene containing polymer being discarded through line 37. The purified butadiene boiled out of the solution in desorber 26 was passed completely or in part to stripper 24 via line 34 or recovered in part as product from line 35. The xylene in scrubber 33 when the polymer in solution has increased to 50% was removed through pipe 43, the polymer separated and the xylene returned through pipe 42. The following figures show that all times during the operation the copper solution remained substantially free of polymeric material.

*Ether extraction of copper solution*

| Hour | Extract, gms./l. | Hour | Extract, gms./l. | Hour | Extract, gms./l. |
|---|---|---|---|---|---|
| 4 | 0.04 | 37 | 0.12 | 61 | 0.32 |
| 13 | 0.12 | 44 | 0.36 | 69 | 0.40 |
| 28 | 0.32 | 52 | 0.36 | | |

Throughout the entire run no solid polymers accumulated in the desorption, adsorption, and soaking solutions of the system. Some sludging of polymers in the wash xylene was observed. This sludging was of such a nature that the polymers were concentrated in the lower portion of the solvent and this portion could be withdrawn and discarded continuously.

It is not intended that this invention should be limited as regards the type of copper solution to which it is applied. Solutions of a wide range of composition may be used so long as they are effective for concentrating diolefins. The solutions may be either acid or basic in nature and may contain as a solubilizing agent such compounds as ammonia, methyl amine, dimethyl amine, pyridine, and other amino compounds.

I claim:

1. An improved copper ammonium acetate absorption and purification method for separating butadiene from a hydrocarbon mixture containing it, together with butenes and small amounts of acetylenes, comprising the steps of contacting said mixture with a solution of copper ammonium acetate to obtain a rich solution containing butadiene and acetylenes, subsequently heating said rich solution to desorb butadiene whereby a lean solution substantially free of butadiene is obtained, exposing said lean solution to conditions causing polymerization of acetylenes, and washing said exposed solution with liquid butene.

2. The improvement in a process of using a solvent to separate a diolefin from a mixture of saturated and unsaturated hydrocarbons containing a diolefin and acetylenes, which comprises contacting said mixture with a cuprous salt solution which selectively dissolves diolefin and acetylenes, separating the resulting cuprous salt solution with the dissolved diolefins and acetylenes from undissolved hydrocarbons, heating the cuprous salt solution with the diolefin and acetylenes in solution to dissolve the diolefin, then further heating the cuprous salt solution to polymerize cuprous salt solution by means of a hydrocarbon the acetylenes remaining in solution, and extracting resulting acetylene polymers from the solvent for the polymers, which solvent is immiscible with the cuprous salt solution.

3. The process according to claim 2, in which the cuprous salt solution of the diolefin and acetylenes is an aqueous solution of copper ammonium acetate containing butadiene and ethyl acetylenes, and in which the cuprous salt solution is returned to the contacting step.

CHARLES E. MORRELL.

REFERENCES CITED

The following references are of record in the file of this patent:

UNITED STATES PATENTS

| Number | Name | Date |
|---|---|---|
| 2,318,988 | Craig | May 11, 1943 |
| 2,463,846 | Bain et al | Mar. 8, 1949 |

Certificate of Correction

Patent No. 2,566,136                                                           August 28, 1951

CHARLES E. MORRELL

It is hereby certified that error appears in the printed specification of the above numbered patent requiring correction as follows:

Column 6, line 44, strike out "cuprous salt solution by means of a hydrocarbon" and insert the same in line 46, after "the";

and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*